United States Patent [19]

Schäfer et al.

[11] Patent Number: 4,921,996
[45] Date of Patent: May 1, 1990

[54] ISOCYANATO-ACYLURETHANES, A PROCESS FOR THEIR PREPARATION AND THEIR USE

[75] Inventors: Walter Schäfer, Leichlingen; Hanns P. Müller, Bergisch-Gladbach; Tillmann Hassel, Cologne, all of Fed. Rep. of Germany

[73] Assignee: Bayer Aktiengesellschaft, Bayerwerk, Fed. Rep. of Germany

[21] Appl. No.: 227,980

[22] Filed: Aug. 2, 1988

[30] Foreign Application Priority Data

Aug. 6, 1987 [DE] Fed. Rep. of Germany ....... 3726050

[51] Int. Cl.$^5$ .................. C07C 125/06; C07C 125/04
[52] U.S. Cl. ........................................ 560/25; 560/26; 560/32; 560/33; 560/137; 560/158; 560/159
[58] Field of Search ....................... 560/24, 25, 26, 32, 560/33, 137, 158, 159

[56] References Cited

U.S. PATENT DOCUMENTS 4,482,737 11/1984 Kuhle et al. ....................... 560/159

FOREIGN PATENT DOCUMENTS 1081460 5/1960 Fed. Rep. of Germany .
2633385 1/1978 Fed. Rep. of Germany .

OTHER PUBLICATIONS

Houben-Weyl, Band E4, 1983, p. 230.

*Primary Examiner*—Alan Siegel
*Attorney, Agent, or Firm*—Joseph C. Gil; Thomas W. Roy

[57] ABSTRACT

The present invention relates to isocyanto-acylurethanes corresponding to Formula I

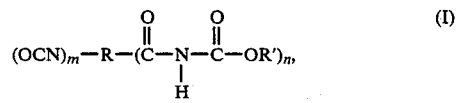

wherein
R has a valency of m+n and is a hydrocarbon group,
R' is a hydrocarbon group and
m and n may be identical or different, and each have a value of 1 or 2.

The present invention also relates to a process for preparation of these isocyanato-acylurethanes which comprises reacting isocyanato-carboxylic acid chlorides with carbamic acid esters. Finally, the present invention is directed to the use of these isocyanato-acylurethanes as intermediate products for the production of thermally cross-linkable synthetic resins or synthetic resin precursors and also as intermediate products for the preparation of cross-linking agents for synthetic resins.

2 Claims, No Drawings

ISOCYANATO-ACYLURETHANES, A PROCESS FOR THEIR PREPARATION AND THEIR USE

BACKGROUND OF THE INVENTION

Field of the Invention

This invention relates to new isocyanato-acylurethanes, to a process for their preparation by the reaction of isocyanato-carboxylic acid chlorides with carbamic acid esters and to their use as intermediate products for the production of thermally cross-linkable synthetic resins or synthetic resin precursors or as cross-linking agents for synthetic resins.

Description of the Invention

The preparation of acylurethanes from carboxylic acid chlorides and carbamic acid esters and their thermal cross-linking with polyhydroxyl compounds is known (DE-AS No. 1,081,460, DE-OS No. 2,633,385, Houben-Weyl, (1983), E4, page 230).

It has now surprisingly been found that this reaction will also take place with isocyanato-carboxylic acid chlorides with selective reaction of the carboxylic acid chloride groups with the carbamic acid esters. This finding must be regarded as surprising since it was to be expected that a selective reaction would not be possible because of the presence of the highly reactive isocyanate group.

The isocyanato-acylurethanes according to the invention resulting as reaction products of the selective reaction are versatile intermediate products, in particular for the production of thermally cross-linkable synthetic resins or synthetic resin precursors or for the production of cross-linking agents for synthetic resins.

SUMMARY OF THE INVENTION

The present invention relates to isocyanato-acylurethanes corresponding to formula I

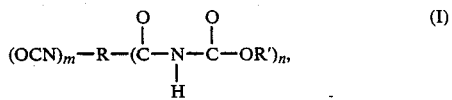

wherein
R denotes any of the following groups having a valency of (m+n); an aliphatic hydrocarbon group having 1 to 18 carbon atoms, a cycloaliphatic hydrocarbon group having 4 to 15 carbon atoms, an aromatic hydrocarbon group having 6 to 15 carbon atoms or an araliphatic hydrocarbon group having 7 to 13 carbon atoms,
R' denotes an aliphatic hydrocarbon group optionally containing ether bridges and having 1 to 18 carbon atoms, a cycloaliphatic hydrocarbon group having 4 to 15 carbon atoms, an aromatic hydrocarbon group having 6 to 15 carbon atoms or an araliphatic hydrocarbon group having 7 to 13 carbon atoms, and
m and n, may be identical or different, and each have a value of 1 or 2.

This invention also relates to a process for the preparation of these isocyanato-acylurethanes, characterized in that isocyanato-carboxylic acid chlorides corresponding to formula II

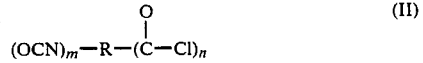

wherein R, m and n have the meanings indicated above are reacted in the temperature range of about 20° to 140° C. with carbamic acid esters corresponding to formula III

wherein R' has the meaning indicated above in a molar ratio of acid chloride groups to carbamic acid ester groups of about 0.9:1 to 1.1:1.

The invention also relates to the use of the isocyanato-acylurethanes as intermediate products for the production of thermally cross-linkable synthetic resins or synthetic resin precursors.

Lastly, the invention relates to the use of the isocyanato-acylurethanes as intermediate products for the preparation of cross-linking agents for synthetic resins.

DETAILED DESCRIPTION OF THE INVENTION

The starting materials for the process according to the invention are isocyanato-carboxylic acid chlorides corresponding to formula II and carbamic acid esters corresponding to formula III.

In these formulae, R, R', m and n have the meanings indicated above. Preferably,
R stands for an alkylene group having 5 to 11 carbon atoms,
R' stands for an alkyl group having 1 to 4 carbon atoms or an alkoxyalkyl group having a total of 2 to 6 carbon atoms and
m and n are each 1.

The preferred isocyanato-acylurethanes according to the invention therefore correspond to formula I in which R, R', m and n have the preferred meanings indicated above.

Isocyanato-carboxylic acid chlorides suitable for the process according to the invention have been described, for example, in DE-AS No. 1,222,919. 6-Isocyantocaproic acid chloride, 11-isocyanato-undecanoic acid chloride, 4-isocyanato-benzoyl chloride, 3-isocyanato-benzoyl chloride and 4-isocyanato-phenylacetyl chloride are preferred.

Esters of carbamic acid to be used for the process according to the invention have been described, for example, in DE-AS No. 1,081,460 and DE-AS No. 1,249,426. Carbamic acid esters of methanol, ethanol, propanol, butanol, glycol monomethylether, glycol monoethylether, glycol monopropylether, glycol monobutylether, 2-hydroxypropylpropylether and 2-hydroxypropylbutylether are preferred.

The isocyanato-carboxylic acid chlorides and carbamic acid esters are put into the process according to the invention in quantities corresponding to a molar ratio of acid chloride groups to carbamic acid ester groups of about 0.9:1 to 1.1:1, preferably 1:1. This means that the components are preferably reacted together in equivalent quantities.

The reaction may be carried out either solvent-free or in the presence of solvents which are inert towards isocyanates and carboxylic acid chlorides under the reaction conditions. Examples include aromatic solvents such as toluene or xylene; chlorinated aromatic compounds such as chlorobenzene or dichlorobenzene; solvents containing ether or ester groups such as tetrahydrofuran, dioxane, glycol monomethylether acetate or methoxypropyl acetate; other solvents such as dimethylformamide, N-methylpyrrolidone or N-methylcaprolactam; and mixtures of such solvents. Halogenated aromatic solvents such as chlorobenzene or 1,2-dichlorobenzene are particularly preferred.

The reaction temperature may vary from room temperature (about 20° C.) to about 140° C.; a temperature range of about 40° to 100° C. is preferred.

The reaction is preferably carried out in the presence of catalytic quantities of Lewis acids. In the context of this invention, these include primarily anhydrous metal halides, preferably chlorides of zinc, cadmium, boron, aluminum or trivalent iron. Zinc chloride and cadmium chloride are the preferred catalysts. "Catalytic quantity" means in the context of this invention a quantity of catalyst of about 0.1 to 10% by weight, preferably about 0.5 to 3% by weight, based on the total weight of acid chlorides and carbamic acid esters.

The reaction may be carried out without the addition of such catalysts if the hydrogen chloride split off in the reaction is bound in the form of hydrochloride by means of a quantity of base at least equivalent to the quantity of hydrogen chloride formed. Suitable bases for this purpose include triethylamine, tributylamine, dimethylaniline, pyridine, collidine, quinoline, isoquinoline and lutidine. Pyridine and quinoline are preferred bases. The catalytic reaction is, however, preferred to the reaction in the presence of bases. In the preferred, catalytic reaction, the hydrochloric acid formed is removed from the reaction mixture by a stream of inert gas.

In a preferred embodiment of the process according to the invention, the carbamic acid ester is introduced into the reaction vessel in an inert solvent together with the catalyst and the equivalent quantity of isocyanato-carboxylic acid chloride is added dropwise at about 40° to 50° C., optionally as a solution in the same solvent. The reaction mixture is heated to about 60° to 100° C. while nitrogen is passed through. The reaction is terminated when no further evolution of HCl takes place and the absorption band of the acid chloride put into the process has disappeared from the IR spectrum of the reaction mixture. The solvent is evaporated off and the product is worked up in known manner, for example by recrystallization.

The reaction according to the invention basically corresponds to the known acylation reaction of carbamic acid esters with acid chlorides described in the literature references given above.

The isocyanato-acylurethanes according to the invention are valuable intermediate products. On the one hand, the compounds according to the invention may be reacted through their free isocyanate groups with compounds containing hydroxyl groups to form the corresponding urethanes. On the other hand the acylurethane groups are blocked reactive groups which react like acylisocyanates when heated to undergo cross-linking reactions with suitable reactants, in particular compounds containing hydroxyl groups.

The isocyanato-acylurethanes according to the invention are therefore suitable, for example, for the preparation of thermally cross-linkable one-component systems by a reaction with organic compounds containing at least two hydroxyl groups carried out at an OH/NCO equivalent ratio of about 10:1 to 2:1, preferably about 5:1 to 2:1, for example in solution or solvent-free, at about 20° to 120° C. The resulting reaction products contain both acylurethane groups and free hydroxyl groups and are therefore self-cross-linking polymers or polymer precursors which undergo thermal cross-linking at temperatures of about 120° to 180° C., preferably about 140° to 170° C., with liberation of the alcohol component present in the isocyanato-acylurethanes. Suitable polyhydroxyl compounds for the preparation of such self-cross-linking polymer precursors include the polyether or polyester polyols known from polyurethane chemistry.

On a completely analogous principle, cross-linking agents for polymers may be prepared from the isocyanato-acylurethanes according to the invention, for example by reacting the compounds according to the invention with polyhydric alcohols having a molecular weight of about 100 to 1000, preferably about 200 to 400, while maintaining an OH/NCO ratio of about 1:1. These reaction products do not, of course, contain any additional hydroxyl groups and are not self-cross-linking, but they are suitable as cross-linking agents for other polyhydroxyl compounds such as the polyether or polyester polyols having a molecular weight of 400 to about 10,000 which are known from polyurethane chemistry.

Reaction of the isocyanto-acylurethanes according to the invention with olefinically unsaturated compounds containing hydroxyl groups, for example (meth)acrylic acid hydroxyalkylesters, at an OH/NCO equivalent ratio of 1:1 gives rise to olefinically unsaturated monomers containing an acylurethane group which is available for thermal cross-linking reactions. These monomers are compounds which are capable of both a radical cross-linking reaction and a thermal cross-linking reaction. They are suitable, for example, as co-monomers for the preparation of polymers with built-in acylurethane groups which are self-cross-linking if they contain free hydroxyl groups or, if they do not contain groups which are reactive with acylurethane groups, they may be used as cross-linking agents as described above.

The invention is further illustrated but is not intended to be limited by the following examples in which all parts and percentages are by weight unless otherwise specified.

EXAMPLES

EXAMPLE 1 (Example of Preparation)

N-(6-isocyanto-caproyl)-carbamic acid ethyl ester 89.2 g (1 mol) of ethylcarbamate and 2 g of zinc chloride in 750 ml of chlorobenzene were introduced into a reaction vessel. 175 g (1 mol) of 6-isocyanatocaproic acid chloride were added dropwise at 45° C. The reaction mixture was heated to 60°–70° C. with stirring while nitrogen was passed through. Evolution of hydrogen chloride came to a standstill after about 10 hours. The reaction mixture was freed from solvent on a rotary evaporator at 60°–80° C., and the product was crystallized in quantitative yield.

M.p.: 85° C.

IR (Nujol): 2250 (NCO): 1760; 1720; 1690 (carbonyl bands) cm$^{-1}$

EXAMPLE 2 (Example of Preparation)

N-(6-isocyanato-caproyl)-carbamic acid-β-methoxyethyl ester 6.65 g (0.05 mol) of carbamic acid-β-methoxyethyl ester and 0.15 g of zinc chloride were heated to 50° C. 8.8 g (0.05 mol) of 6-isocyanato-caproyl chloride were added dropwise to the resulting melt. Nitrogen was passed through the mixture while it was heated to 60° C. for 3 hours and then to 100° C. for 26 hours. The reaction was then terminated (IR control). The mixture was cooled, taken up in 100 ml of toluene and decanted to remove insoluble constituents; the toluene was removed under vacuum. 11 g of a colorless oil was obtained, which solidified to a waxy solid. Yield: 11 g=85% M.p.: 77° C.

IR (Nujol): 2250 (NCO); 1760; 1720; 1690 (carbonyl bands) cm$^{-1}$

EXAMPLE 4 (Example of Preparation)

N-(6-isocyanato-caproyl)-carbamic acid-β-methoxyethyl ester 8.8 g (50 mmol) of 6-isocyanato-caproyl chloride were introduced into 25 ml of toluene. A mixture of 5.95 g (50 mmol) of carbamic acid-β-methoxyethyl ester, 3.96 g (50 mmol) of pyridine and 15 ml of toluene was added dropwise at 0° C. The mixture was stirred for 6 hours at 25° C. and then heated to 60° C. for 10 hours. It was diluted with 100 ml of toluene and extracted once with 50 ml of 0.1N HCl. The organic phase (MgSO$_4$) was dried and filtered and the solvent was evaporated off. 5.1 g of a product similar in its properties to the product from Example 2 were obtained. Yield: 5.1 g=40%.

EXAMPLE 4 (Example of Practical Application)

20.4 g of a branched, OH functional polyester of terephthalic acid, neopentyl glycol, hexanediol and trimethylolpropane (ratio by weight of the said components 15:8:1.2:1 in the sequence given) containing 1.5%=18 mmol of OH were mixed with 2 g (9 mmol) of N-(6-isocyanato-caproyl)-carbamic acid ethyl ester and the mixture was melted at 120° C. to form a homogeneous mass. The resulting product, which can be pulverized, had a melting point of 70° C. and was readily soluble in ethyl acetate, acetone or tetrahydrofuran. When applied as a solution or as a powder and stoved at 170° C., it formed a cross-linked coating.

EXAMPLE 5 (Example of Practical Application)

20 g (0.08 mol) of N-(6-isocyanato-caproyl)carbamic acid ethyl ester were reacted solvent-free with 6.4 g (0.025 mol) of tris-hydroxyethyl isocyanurate in the presence of 0.5 g of Sn dioctoate at 70° C. The product, which was free from isocyanate groups, had a melting point of 50°-60° C. 1 g of this product was dissolved in ethyl acetate with 4 g of the OH functional polyester from Example 4. A film cast from this solution was stoved at 170° C. for 30 minutes to form a cross-linked coating.

EXAMPLE 6 (Example of Practical Application)

19.8 g (0.14 mol) of methacrylic acid-β-hydroxypropylester and 30 g (0.14 mol) of N-(6-isocyanato-caproyl)-carbamic acid ethyl ester were dissolved in 100 ml of tetrahydrofuran and 0.5 g of Sn dioctoate and kept at 70° C. for 2 hours, during which time the NCO band in the IR spectrum disappeared. After removal of the solvent, a waxy product was obtained which had an acrylate function capable of radical polymerization and in which the N-acyl-carbamic acid ester group could be cross-linked with suitable OH components as in Examples 4 and 5.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanato-acylurethane corresponding to formula I

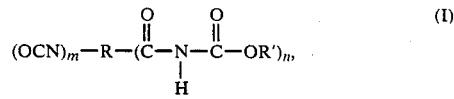

wherein
R has a valency of (m+n) and represents an aliphatic hydrocarbon group having 1 to 18 carbon atoms, a cycloaliphatic hydrocarbon group having 4 to 15 carbon atoms, an aromatic hydrocarbon group having 6 to 15 carbon atoms or an araliphatic hydrocarbon group having 7 to 13 carbon atoms, R' represents an aliphatic hydrocarbon group optionally containing ether bridges and having 1 to 18 carbon atoms, a cycloaliphatic hydrocarbon group having 4 to 15 carbon atoms, an aromatic hydrocarbon group having 6 to 15 carbon atoms or an araliphatic hydrocarbon group having 7 to 13 carbon atoms and m and n, may be identical or different, and each have a value of 1 or 2.

2. The isocyanato-acylurethane of claim 1 wherein
R represents an alkylene group having 5 to 11 carbon atoms, R' represents an alkyl group having 1 to 4 carbon atoms or an alkoxyalkyl group having 2 to 6 carbon atoms and m and n each represent 1.

* * * * *